April 17, 1962 T. R. GARRITY 3,030,014

MAGNETIC CHARACTER SENSING

Filed Dec. 30, 1958 3 Sheets-Sheet 1

INVENTOR
Thomas R. Garrity
BY
Sughrue & Rothwell
ATTORNEYS

April 17, 1962 T. R. GARRITY 3,030,014

MAGNETIC CHARACTER SENSING

Filed Dec. 30, 1958 3 Sheets-Sheet 2

INVENTOR

Thomas R. Garrity

BY Sughrue & Rothwell

ATTORNEYS

April 17, 1962 T. R. GARRITY 3,030,014

MAGNETIC CHARACTER SENSING

Filed Dec. 30, 1958 3 Sheets-Sheet 3

INVENTOR
Thomas R. Garrity

BY Sughrue & Rothwell
ATTORNEYS

United States Patent Office 3,030,014
Patented Apr. 17, 1962

3,030,014

MAGNETIC CHARACTER SENSING

Thomas R. Garrity, Wappingers Falls, N.Y., assignor to International Business Machines Corporation, New York, N.Y., a corporation of New York Filed Dec. 30, 1958, Ser. No. 783,771
18 Claims. (Cl. 235—61.11)

This invention relates generally to a means and method for sensing magnetic characters and more particularly to a means and method of sensing characters printed in magnetic ink.

A long standing problem in the art of character sensing has been the unavailability of a method or system for mechanically, or electrically sensing a character directly in its printed form without the need for an additional particular code associated with each character for providing a response in a charactre code sensing device. With the increasing trend towards the use of magnetic media for the storage of information, the problem of providing simultaneously both a visual and magnetic representation of magnetically recorded information has become increasingly important.

One means of providing simultaneously a visual and magnetic storage or record is to print characters with magnetic ink on a nonmagnetic record member such as a check, document, etc. The problem then becomes one of providing a reliable character sensing system which is capable of accurately sensing each printed character. The present invention provides a solution to this problem and teaches a method and means for directly sensing magnetic characters.

Therefore, it is the principal object of this invention to provide a method and means of directly sensing magnetic characters.

A more specific object is to provide a means and method for continuously scanning or sensing characters printed with magnetic ink on a non-magnetic record member.

A further object is to sense a magnetic character by sweeping the character with a time-varying magnetic field and sensing changes of magnetic flux due to the configuration of the character.

Another object is to provide a means and method of sensing magnetic characters by scanning the characters with a shifting magnetic null point or a shifting magnetic boundary.

A still further object is to provide a magnetic character sensing system wherein the magnetic character may be stationary with respect to the sensing head so that relative movement between the character and head is not required.

It is also an object of this invention to provide magnetic transducer heads for sensing magnetic characters in accordance with the above methods and principles.

A still further object is to sense and locate a change in magnetic reluctance along the width of a gap in a magnetic circuit.

In the attainment of the foregoing objects, there is provided in a magnetic circuit a gap, certain variations in magnetic reluctance of which it is desired to sense and locate with respect to the widthwise dimension of the gap. These variations in reluctance may be caused by a magnetic character disposed across the gap. A magnetic boundary is formed across the gap in such a manner that the magnetic flux density in one direction on one side of this boundary is relatively high, while the flux density in the same direction on the other side of the boundary is substantailly zero. This boundary is caused to sweep along the width of the gap to vary in time the total flux across the gap in this direction, thereby inducing a correspondingly varying voltage in an associated sense winding linked by this changing total flux. The boundary is caused to sweep across the width of the gap by establishing a time varying magnetic field across the gap for producing flux in this direction and by providing a predetermined opposition to this flux varying along the width of the gap.

To aid in understanding the concept involved herein, the magnetic flux in only one direction may be considered. This unidirectional flux may be considered as beginning to flow at zero time across the gap at one end thereof, the flow of flux then progressing in a predetermined manner along the width of the gap in time until it reaches the other end thereof at final time or at the end of the sweep. The changing flux across the gap caused by this progressive flow of unidirectional flux induces in the sense winding a voltage proportional to this progressive change of flux flow. However, if a change in reluctance of the gap occurs along the width thereof, a voltage other than the aforementioned proportional voltage will be induced in the sense winding to thereby detect and locate along the width of the gap the point at which the change in gap reluctance occurred.

In one embodiment of this invention, this predetermined varying opposition is provided by a linear magnetic field gradient established along the width of the gap in opposition to the time varying magnetic field. In another embodiment the predetermined varying opposition is provided by the configuration of an additional gap which, for example, may vary linearly in length along its width to thereby vary linearly the reluctance of the magnetic circuit including the first gap.

The sense winding associated with the magnetic circuit is linked by the varying flux in this direction so that a correspondingly varying voltage is induced therein. However, when the boundary sweeps a point in the gap at which there occurs a sudden or nonlinear change in reluctance, the resultant change in flux density causes a corresponding change in flux, linking the sense winding to induce therein a voltage pulse and thereby indicate the location along the gap at which this change in reluctance occurred.

Other objects of the invention will be pointed out in the following description and claims and illustrated in the accompanying drawings which disclose, by way of example, the principles of the invention and the best mode which has been contemplated of applying those principles.

Figures 3A, 6, 7:
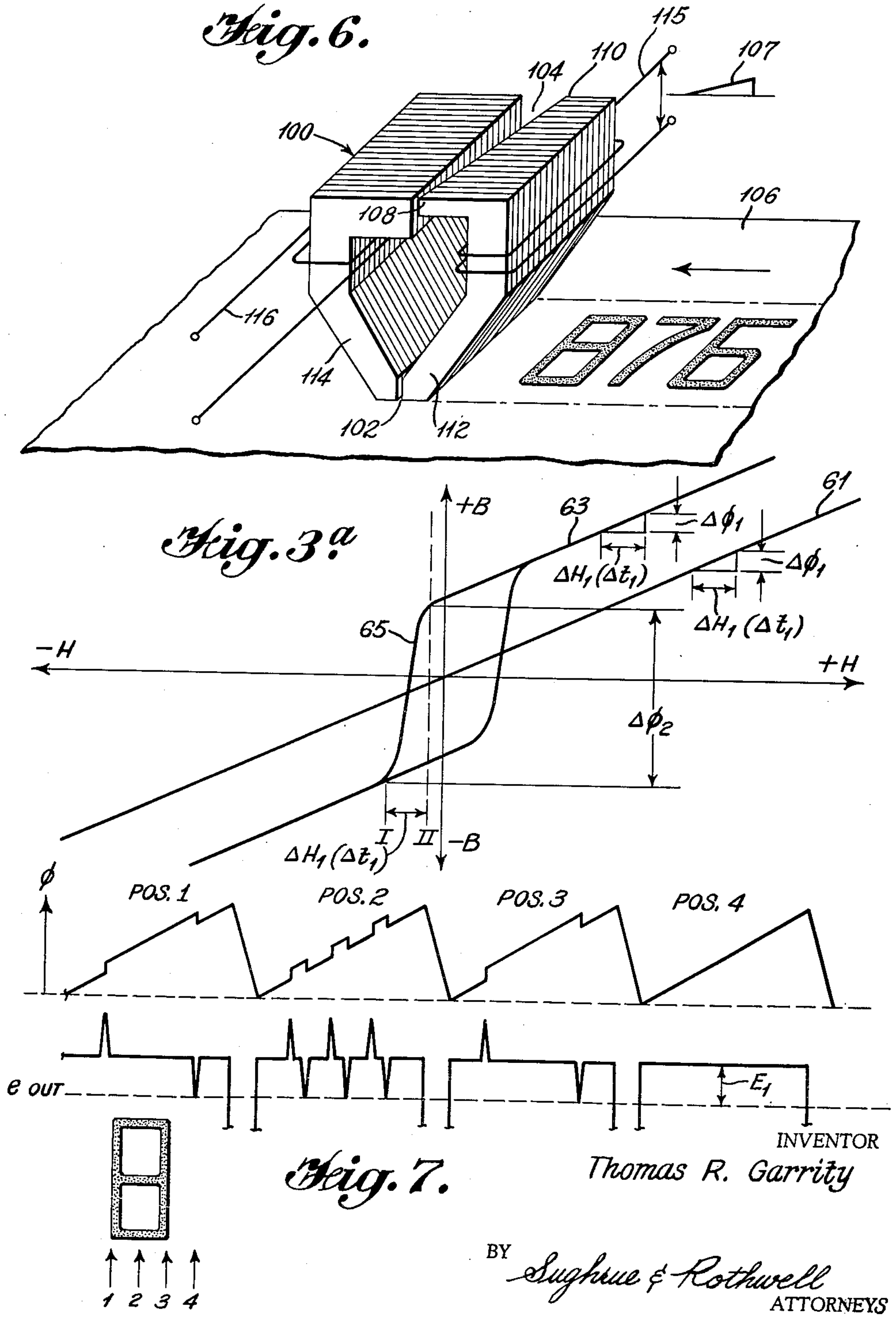

FIG. 3*a* is a diagram showing the hysteresis loop of a magnetic ink and the hysteresis loop of air and the relationship during the sensing of a character.

Figures 1, 2:
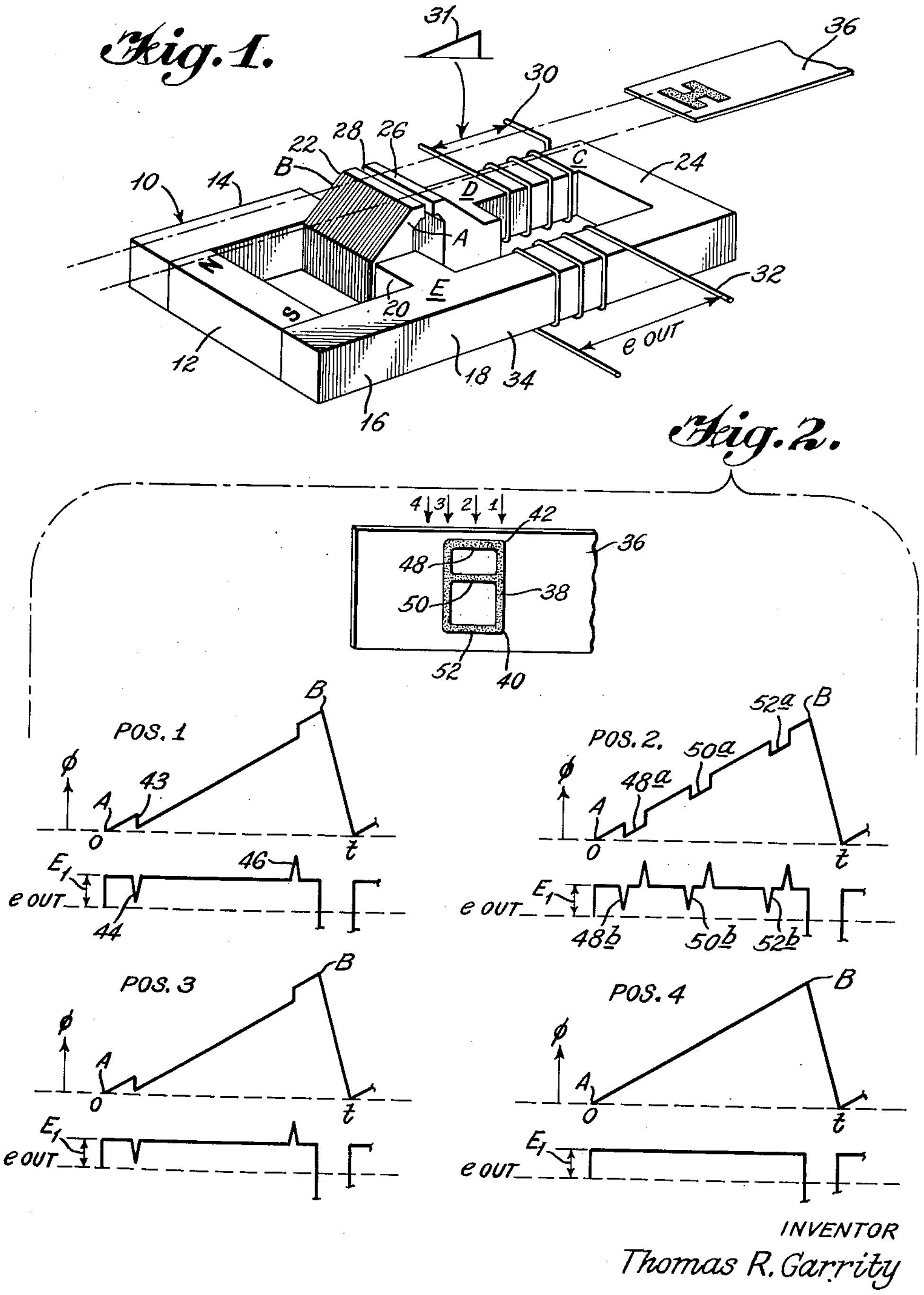
FIG. 1 illustrates a magnetic transducer head embodying this invention and suitable for sensing a character printed in magnetic ink.
FIG. 2 shows a character printed in magnetic ink on a record member together with a graphical representation of the magnetic flux and associated induced voltages produced as a result of the scanning of the complete character by the transducer shown in FIG. 1.
Figures 4, 5:
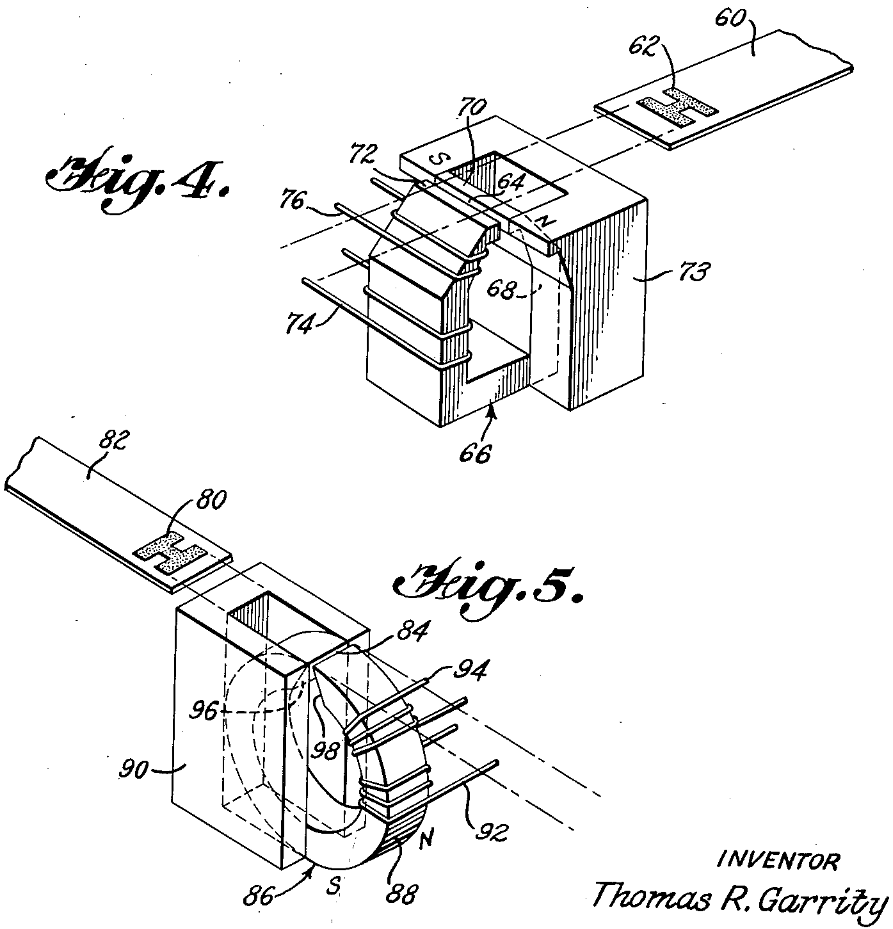

FIGS. 4 and 5 are modifications of the transducer head shown in FIG. 1;

FIG. 6 illustrates a transducer head incorporating a second embodiment of this invention; and FIG. 7 is similar to FIG. 2 and shows a character printed in magnetic ink on a record member together with a graphical representation of the magnetic flux and associated induced voltages produced as a result of the scanning of the complete character by the transducer shown in FIG. 6.

In FIG. 1 there is shown a magnetic transducer or head generally indicated by the reference numeral 10. Transducer 10 is composed of permanent magnet 12 connected between the legs 14 and 16 of a yoke or core 18 of magnetically permeable material. Connected between leg 14 and 20 of yoke 18 is a laminated pole piece 22. Integrally formed with the end of leg 24 is a pole piece 26 which together with pole piece 22 defines the sense air gap 28. Wound on leg 24 is a sweep winding 30 which may be connected to a power (not shown) for supplying a cyclical sweep current which for illustration has been shown as a saw tooth waveform 31.

A sense winding 32 is wound on the leg 24 of magnetic yoke 18. Sense winding 32 may be connected to any conventional signal detecting means (not shown). A change in magnetic flux across the sense gap 28 caused by a change in reluctance of the gap due to the presence of a magnetic character across the gap would induce voltage changes in sense winding 32. For example, a character, "H" is printed in magnetic ink on a document or record member 36 which travels in the direction indicated across sense gap 28. The resultant variations in the magnetic flux across the gap would thereby induce a correspondingly varying voltage in sense winding 32 to indicate only a change in the total reluctance of the gap. However, as explained below, the means and method of this invention do not depend upon the movement of the character relative to the gap, and in addition, provide a positive sensing of the character by detecting the location along the width of the gap at which variations in reluctance occur due to the configuration of the magnetic character.

An explanation of a magnetic character sensing system embodying the magnetic transducer shown in FIG. 1 will now be described with reference to the wave forms shown in FIG. 2.

Permanent magnet 12 is connected between legs 14 and 16 of magnetic yoke 18 to provide a linear magnetic potential gradient along the width of sense gap 28, the width of the gap being the dimension extending from point A to B. This provides across the gap a uniform gradient of, for example, 100 units of magnetic potential increasing linearly from point A to point B along the gap edge of pole piece 22. Point C in leg 24, point E in yoke 18 and point A of pole piece 22 are at a magnetomotive ground or common magnetic potential, i.e., points A and C are at equal magnetomotive potential since legs 24 and 20 are both part of the common yoke 18 and meet at common point E.

Figure 3:
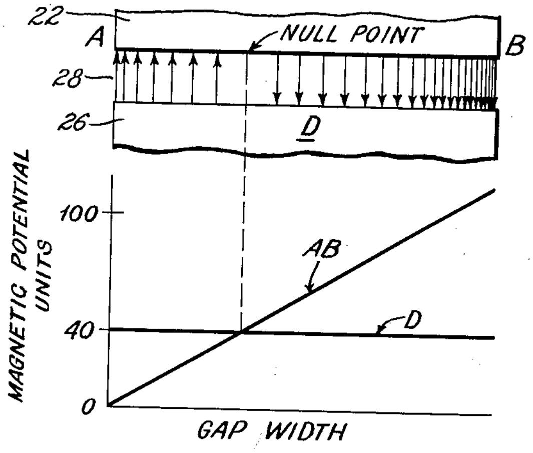
FIG. 3 is a schematic representation of the flux pattern present in the air gap of the transducer when no magnetic character is associated with the gap.

If winding 30 is connected to a constant direct current source so that the magnetic potential appearing across the gap along the gap edge of pole piece 26 has a constant value and is of the same polarity but in opposition to that potential provided by permanent magnet 12 across the gap at the gap edge of pole piece 22, then there will be one magnetic potential null point or boundary along the width of gap 28 where the opposing magnetic fields produced by permanent magnet 12 and sweep winding 30 are equal and, therefore, no magnetic flux will flow across this point of the gap. The flux on either side of this boundary is in opposite directions as shown in FIG. 3 and described below.

If, prior to the application of a constant direct current to winding 30, the magnetic reluctance of a portion of gap 28 is lower than the rest of the gap because of the presence of magnetic material, such as a magnetic character, then the flux density at this portion of the gap will be greater than that at the rest of the gap. Assuming that the direct current is now applied to winding 30 so that a null area occurs within this portion of the gap, it can then be seen that the change in magnetic flux density in this null area is greater than if the null occurred at an area in the gap where pole pieces 22 and 26 were separated only by air. The higher reluctance presented by air in the rest of the gap allows less magnetic flux to flow as compared to the portion of the gap overlying the magnetic character. Therefore, the total reduction in flux across gap 28 which occurs when the null is at a portion of the gap separated only by air is less than at the portion overlying the magnetic character. Since the voltage induced in sense winding 32 is directly proportional to the time rate of change of the total magnetic flux which flows through gap 28 and leg 24 and links winding 32, it can be seen that the presence of magnetic material in the null area will cause a greater voltage to be induced in winding 32 than when there is only air in the area of the gap at which the null point occurs.

Since the linear magnetic field gradient provided across gap 28 by permanent magnet 12 extends along the width of gap 28, it can be seen that if, instead of a constant direct current, a saw-tooth sweep current is caused to flow through sense winding 32, then the null point can be made to travel or sweep back and forth along the width of the gap and thereby provide vertical scanning of the character "H" printed with magnetic ink on document 36. Since it is only at this null point where the flux density is independent of the gap reluctance, it is in the null area including this point that sampling of the printed character must occur. As the null point moves, it continuously samples or scans the printed magnetic character on the document by canceling in the null area the effect of the magnetic shunt formed by the character.

As shown in FIG. 2, a character "8" printed in magnetic ink has been divided into four positions or zones for scanning or sensing. In position 1, the first vertical side 38 of the character appears across sense gap 28 with the length of this side coinciding with the width of the gap. The presence of the magnetic character in the gap reduces the reluctance of the gap, and since the vertical dimension or height of the character is less than the width of gap 28, there is a great deal more flux flowing across the gap in the area overlying the character side 38 as compared with adjacent areas of the gap separated only by air. With the permanent magnet north (N) and south (S) poles located as shown in FIG. 1, the total flux and resultant induced voltage wave forms appearing in sense winding 32 for positions 1 through 4 are plotted against time in FIG. 2. At position 1, and at the other three positions also, the uniform magnetic potential gradient caused by permanent magnet 12 produces across the sense gap 28 a flux pattern which decreases in flux density in the direction from B to A, i.e., the flux density across the gap at the point B is at its highest value due to the magnetic field provided by the magnet. Point A is at zero or ground magnetic potential and the flux density at this point is likewise zero. This is the picture which exists when there is no input to sweep winding 30. It can be seen that as position 1 of the magnetic character "8" passes across the gap under these conditions, there would be a substantial increase in the total flux across sense gap 28 with a high flux density in the area which overlies the magnetic material of the character. This increase in flux density would induce only a single voltage pulse in sense winding 32, since the sense winding would see only a single total change of flux with respect to time as the character moved across the gap. Another single voltage pulse would be induced as the character moved out of the gap. This would appear to suitably identify the portion of the character appearing in position 1 since the change in flux would be proportional to the amount of magnetic material appearing in position 1 and the induced voltage would in turn be proportional to the rate of change of flux. The same amount of magnetic material separated into vertically spaced segments could produce substantially the same single change in reluctance as a continuous strip. Therefore, there appears the problem of providing a means of distinguishing between these situations so that any portion of a character appearing in a scanning position 1 can be accurately sensed and identified.

The present invention solves this problem by providing a time varying magnetic field sweeping the width of sense gap 28 so that changes in reluctance occurring at all points along the gap due to a character portion appearing in a scanning position may be sensed and located relative to the width of the gap. With this arrangement, sensing of a printed character does not depend on relative physical movement between the character and a transducer head at the time of sensing. As one manner of accomplishing this result, a time varying unidirectional current, such as a sawtooth wave, is applied to sweep winding 30 with a polarity such that a time varying magnetomotive force is established in pole piece 26 in opposition to the gradient appearing in pole piece 22.

There is shown in FIG. 3 a schematic representation of the magnetic field and resultant flux pattern in sense gap 28 of magnetic transducer 10. The line A, B represents the magnetic field gradient across sense gap 28 due to the permanent magnet 12, while the line D indicates the magnetomotive force produced by winding 30 at one specific instant of time, in this case, at the value of sweep current which establishes a magnetic field of 40 magnetic potential units across the gap. At the top of FIG. 3, the vertical arrows indicate the direction and pattern of flux flowing across tense gap 28 when these magnetic field conditions exist and when there is no magnetic material appearing in the gap. Since the magnetic potentials produced by permanent magnet 12 and the sweep current in winding 30 are in opposition, a null point occurs in the area along the gap at which the permanent magnet field gradient is also equal to 40 magnetic potential units. As shown in the upper part of FIG. 3, at this point of the gap there is no magnetic flux passing through the gap and the flux lines on either side of the null point are in opposite directions. In addition, the flux density on either side of the null point will be at a lower value than at the extreme ends of the sense gap since the resultant magnetic field strength near the null point is very low, and as the field strength increases in opposite directions away from the null point, the flux density correspondingly increases.

Before explaining the output waveforms, shown in FIG. 2, it might be helpful to examine the hysteresis loops of the air gap with and without magnetic ink present as shown in FIG. 2A. Consider the gap length to be divided into ten equal parts. Assume, also, that magnetic ink, when present, exists in discrete quantities such as to cover one or more of the ten parts completely. The hysteresis loops of any of these ten segments may be represented as shown in FIG. 3*a*. With no ink present, the hysteresis loop is a straight line 61. A linear relationship exists between field strength H and flux density B. With ink present, the hysteresis loop represented by curve 63 exhibits a non-linearity in the region between I and II. If the sweep current varies linearly with time and the field strength varies linearly with sweep current, the H plot in FIG. 3*a* can be considered as the time plot. Therefore, when the null point sweeps an area where there is magnetic ink, the value $d\phi/dt$, which has been a constant $\Delta\phi_1/\Delta t_1$ up to this point, suddenly changes to $\Delta\phi_2/\Delta t_1$, thereby causing an abrupt change in output signal. It is obvious that square-loop magnettic ink could also be used.

As shown in FIG. 3*a*, the change in slope 65 of curve 63 occurs between the values of magnetic potential indicated by I and II which define the boundaries of the null area in which the actual sensing of the character occurs. This null area does not occur directly at the null point ($H=0$), but rather at a slightly negative value of H. It is in this null area that the time rate of change of flux density changes due to the presence of magnetic material thereby inducing a voltage pulse in the sense winding 32.

In FIG. 2 there are shown waveforms for the four positions of the character "8" shown in FIG. 2. In each position, the upper wave form A, B shows changes in total flux $\phi$ through gap 28 and sense winding 32, and the lower wave form shows the voltage $e_{out}$ induced in sense winding 32. For purposes of example, assume that the magnetic field gradient across gap 28 from B to A has produced a magnetic potential of 100 magnetic units at B and zero at A. Also assume that the sweep current through winding 30 supplies across the gap an opposing magnetic potential at the gap edge D of pole piece 26 such that it varies in time from zero to a maximum value of 100 units of magnetic potential. If there is no magnetic material appearing in the gap in position 1, for example, the increase with time in flux density along the width of the sense gap 28 due to the time varying magnetic potential is linear as is the change in total flux $\phi$ through the gap, and therefore, a constant voltage E is induced in sense winding 32. However, now assume that the lower edge 40 of character "8" is located in sense gap 28 at the point which corresponds to a permanent magnet field strength of 10 magnetic units, then when the sweep current reaches a value to produce 10 magnetic units, there will be a sudden reduction in flux density to zero at this point. As shown at 43 in Pos. 1, FIG. 2, the subtraction from total flux $\phi$ through gap 28 and sense winding 32 is now greater than in the previous portion of the gap where only air is present since the flux density is greatest where magnetic material is across the gap. This sudden decrease in flux density and total flux $\phi$ induces pulse 44 in sense winding 32. As the sweep current increases linearly with time in magnitude, the time varying magnetomotive force also increases linearly and the null point effectively moves from A to B and from lower edge 40 to the upper edge 42 in position 1 of the character. There is once again a linear increase in flux density and total flux as the sweep current increases and the null sweeps from edge 40 until just before edge 42. However, as the null point crosses over the edge 42, which is located at a magnetic field gradient value of say 90 magnetic units, there is a sudden change in flux density and total gap flux at this time, but the null point now effectively removes less flux from the total gap flux. This results in a sudden return in the gap flux density at this point to the value corresponding to only air appearing in the sense gap. The resulting change in total gap flux induces in sense winding 32 a voltage pulse 46 opposite in polarity to pulse 44. It can therefore be seen that the time spaced voltage pulses 44 and 46 appearing in sense winding 32 present an accurate representation of the configuration of the portion of the magnetic character appearing in scanning position 1.

As the record 36 traverses sense gap 28, the succeeding positions appear across sense gap 28. In each position, the sweep current is applied to letect changes in the magnetic areas of the character appearing in that position in the gap. In position 2, magnetic portions 48, 50 and 52 cause abrupt changes in the total gap flux as indicated respectively at $48_a$, $50_a$ and $52_a$. Corresponding positive and negative voltage pulses $48_b$, $50_b$ and $52_b$ are thereby induced in sense winding 32 to present an accurate representation of the portion of the magnetic character appearing in position 2. The portion of the character appearing in position 3 is identical to that appearing in position 1 and therefore the wave forms shown in position 3 are the same as those in position, the sweep current is applied to detect changes in position 4, therefore, there is only a uniform change in flux due to the increasing field from sweep winding 30, and therefore, the induced voltage $e_{out}$ in sense winding 32 remains at the constant value E. In FIG. 4 there is shown another transducer head embodying this invention. A non-magnetic record or document 60 carrying the character 62 printed in magnetic ink is fed across the sense gap 64 of magnetic transducer head 66. Once again, the opposite edges of the sense gap are provided with opposing magnetic potentials for the purpose of providing in the gap a sweeping null point for sensing the character 62. A magnetic field gradient is established across gap 64 by means of the permanent magnet 68 which is formed integrally with pole piece 70. A soft iron keeper 73 is positioned around magnet 68. An opposing time varying magnetic field is produced in pole piece 72 by virtue of a sawtooth sweep current passing through sweep winding 74. Changes in flux across gap 64 induce a voltage in sense winding 76 wound on the transducer head. The principle and manner of sensing is identical with that of transducer head 10 as described in connection with FIGS. 1 and 2.

In FIG. 5 there is shown still another embodiment of this invention. A character 80 is printed with magnetic ink on non-magnetic record member 82 and fed across the sense gap 84 in transducer head 86. Transducer head 86 is comprised of two elements: a permeable, substantially circular core 88 and a permanent magnet 90. Wound on core 88 is a sweep winding 92 to which a sawtooth sweep current may be applied and a sense winding 94 for sensing changes in the flux passing through sense gap 84. Once again, the permanent magnet establishes a uniform magnetic field gradient in pole face 96. An opposing time varying magnetic potential is produced in pole face 98 at the other gap edge by means of the sweep current flowing through the sweep winding 92. As explained in connection with FIGS. 1 and 2, a magnetic null point vertically sweeps the magnetic character 80 and the voltage pulses induced in sense winding 94 indicate the changes in magnetic reluctance along the width of sense gap 84 caused by the vertical sweeping of character 80, thereby sensing the character.

In FIG. 6 there is shown another embodiment of this invention and in FIG. 7 the associated wave forms. The laminated magnetic transducer head 100 is provided with a sensing or reading gap 102 and a back gap 104. No permanent magnet is required for reading the characters "8," "7" and "6" printed in magnetic ink on a record member 106 which travels across the sense gap 102. With this arrangement, only a sweep signal, such as sawtooth wave 107, is applied to the sweep winding 115 wound on the head. The length of gap 104 increases from point 108 to the point 110 according to a predetermined pattern, in this case linearly. When a sawtooth wave of current is applied to the sweep winding, the back gap saturates first at point 108, its smallest length. The flux will immediately begin to flow across the gap at point 108 from the right-hand laminated magnetic structure 112 to the left-hand magnetic structure 114. This same flux will appear at the front end of sense gap 102 as viewed in FIG. 6. As the sweep current increases, the back gap right-hand member progressively saturates in the direction from point 108 to point 110. As back gap 104 progressively saturates and forces the flux path to change, the flux pattern will correspondingly change at sense gap 102. This changing flux will cause a linear increase in total flux through the magnetic structures 112 and 114 and through the gaps 102 and 104 in accordance with the increasing value of sweep current 107.

However, whenever magnetic ink is present along the width of the gap 102, there is a sudden increase in flux due to the lower reluctance presented by the magnetic character across the gap. As the sweep current increases in each position, sense gap 102 is effectively swept by a magnetic boundary, on one side of which there is a very high flux density due to progressive saturation of back gap 104 and on the other side of which there is substantially zero or negligible flux density due to the increasing length of the back gap. In FIG. 7 there are shown waveforms corresponding to the total gap flux $\phi$ and induced by voltages $e_{out}$ as character "8" appears beneath the transducer head 100 and is sensed or read. Once again, if there is no magnetic material appearing in the gap, the flux curve will have a uniform slope indicating a uniform increase of flux as the back gap saturates from 108 to 110 and the boundary sweeps the width of the sense gap. However, if the position 1 portion of the magnetic character "8" appears across the gap, there is a sudden increase in flux density at point 118 as the boundary sweeps across an edge of the character. Therefore, an increase in total gap flux $\phi$ occurs and causes a positive voltage pulse **118*a* to be induced in sense winding 116 which is linked by the changing flux. However, as the back gap progressively saturates, the boundary sweeps the width of the sense gap and voltage pulses are induced in sense winding 116 whenever the sweeping flux encounters a change in magnetic reluctance of gap 102 due to the presence of the magnetic character across the gap. Therefore, it can be seen that in position 1 the total flux will be reduced at point 120 when the boundary sweeps across the upper edge of the character to induce the negative pulse 120 in the sense winding; in position 2 there are six abrupt changes in flux resulting in six induced voltage pulses; and again in position 3 there are two abrupt changes in flux. Since no part of the magnetic character appears in position 4, there are no pulses induced in sense winding 116 and only the constant voltage E is induced by the uniform rate of change of the flux linking sense winding 116. The voltage pulses induced in winding 116** are therefore indicative of the configuration of the magnetic material in the gap and provides character sensing.

Even though in the embodiments described above the vertical dimension of the characters extends parallel with the width of the gap. The characters may be disposed at any desired angle with respect to the gap. In addition, it is also within the scope of this invention to provide relative movement between a magnetic character and the magnetic boundary in the sense gap by any means. For example, the boundary may be fixed relative to the width of the gap instead of being moved by the current in sweep windings 30 and 115. In this case, the current in windings 30 or 115 is constant and the boundary is stationary. However, sensing of a character may be accomplished by physically moving the transducer head and magnetic character relative to each other, thereby causing the magnetic boundary to move relative to the character and provide character sensing in the manner as described above. In the FIG. 1 embodiment the boundary is provided by the null point, and in the FIG. 6 embodiment the boundary is provided by the wall of flux caused by the saturation of the back gap up to one point along tis width. Also, it is contemplated that the magnetic characters or indicia may pass between the pole pieces defining the sense gap so that the characters or indicia are actually physically located in the gap rather than being disposed across the gap.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method of detecting and locating a point along the width of a gap in a magnetic circuit at which a change in the magnetic reluctance of the gap occurs that comprises establishing in said magnetic circuit an opposition to the flow of magnetic flux across said gap in one direction, said opposition varying in a predetermined manner along the width of said gap, establishing across said gap a time varying magnetic potential for producing magnetic flux in said one direction, and sensing changes in said magnetic flux caused by the gap reluctance varying along the width of the gap, thereby detecting and locating a point along the width of said gap at which a change in the magnetic reluctance of said gap occurs.

2. A method as defined in claim 1 wherein said opposition varies linearly along the width of said gap.

3. A method as defined in claim 2 wherein said magnetic potential varies linearly in time.

4. A method of detecting and locating a point along the width of a gap in a magnetic circuit at which a change in the magnetic reluctance of the gap occurs that comprises establishing across said gap a magnetic field to provide a magnetic boundary across said gap so that the magnetic flux density on one side of said boundary in one direction across said gap is substantially greater than the magnetic flux density in said direction on the other side of said boundary, moving said magnetic boundary relative to said point and sensing changes of said magnetic flux in said direction occurring when said boundary crosses a point along said gap at which a change in magnetic reluctance occurs, thereby detecting and locating a point at which said change in reluctance occurs.

5. A method as defined in claim 4 wherein said magnetic boundary is established by providing in said magnetic circuit an opposition to flux in said one direction, said opposition varying in a predetermined manner along the width of said gap, and establishing across said gap a time-varying magnetic potential for producing flux across said gap in said direction to thereby move said boundary along the width of said gap.

6. A method of detecting and locating a point of unknown change in the magnetic reluctance occurring along the width of a gap in a magnetic circuit comprising establishing across said gap a magnetic field to produce across said gap a predetermined magnetic flux which varies linearly simultaneously in time and along the width of said gap and sensing a change in said magnetic flux caused by an unknown change of magnetic reluctance of said gap along the width thereof, thereby detecting and locating said point along the width of said gap.

7. A method of detecting and locating a variation in the magnetic reluctance along the width of an air gap in a magnetic circuit that comprises initially establishing a magnetic field across said gap to produce a flux thereacross, then sweeping said gap with a magnetic potential null point, and sensing the change in flux occurring when said null point sweeps from an area of one reluctance to another to thereby detect and locate the variation in reluctance occuring between the areas.

8. A method of sensing a character printed with magnetic ink on a non-magnetic medium that comprises establishing across the reading gap in a magnetic transducer head an opposition to flow of magnetic flux across said gap in one direction, said opposition varying in a predetermined manner along the width of said gap, providing across said gap a time-varying magnetic potential for producing magnetic flux in said one direction, moving said medium so that said character is disposed across said gap with the vertical dimension of the character extending along the width of said gap, and sensing changes in said magnetic flux along said gap caused by a change in gap reluctance due to the configuration of said character.

9. A method of sensing a magnetic character that comprises establishing across a gap in a magnetic transducer head a magnetic field for providing a magnetic boundary across said gap so that the magnetic flux density on one side of said gap in one direction is substantially greater than the flux density in said direction on the other side of said boundary, placing said magnetic character across said gap, moving said magnetic boundary along the width of said gap, and sensing changes in said flux in said direction occurring when said boundary crosses an edge of said character to thereby sense said character.

10. In a magnetic character sensing system including a non-magnetic medium carrying a magnetic character, the combination comprising a magnetic transducer having a longitudinally extending air gap, means for providing a magnetic field gradient extending along one longitudinal edge of said gap, means for providing at the other longitudinal edge of said gap a magnetomotive force in opposition to said gradient, said gradient and said magnetomotive force being equal to each other at at least one point along the width of the gap to define a magnetic potential null point, means for providing relative movement between said null point and a magnetic character disposed across said air gap, and means for detecting the change in magnetic flux across said gap caused by said relative movement to thereby sense said character.

11. In a magnetic character sensing system including a movable record having areas carrying magnetic indicia, the combination comprising a sensing unit having a gap therein, said gap having width and length dimensions substantially transverse to and parallel with, respectively, the direction of movement of the record which is adapted to be moved in operative relation to said gap, means for providing a magnetic field across said gap in the lengthwise dimension, said field producing means establishing a point of magnetic flux reversal moving in a direction along the widthwise dimension of the gap to scan said indicia, and means associated with said flux for determining the passage of said point into and out of those areas containing magnetic indicia.

12. A magnetic transducer head for sensing magnetic characters printed on a non-magnetic record member comprising a pair of permeable pole pieces forming a longitudinally extending air gap in said head, a permanent magnet connected across one of said pole pieces for establishing a linear magnetic field gradient extending along the gap edge of one pole piece, a sweep winding wound on the other pole piece for providing a magnetomotive force across said gap in opposition to said magnetic field gradient, means for varying said magnetomotive force linearly with time to provide across said gap a magnetic potential null point which sweeps the width of said gap, and a sense winding wound on said transducer head for sensing changes in flux across said gap occurring when said null point sweeps across a magnetic character located in said gap.

13. A magnetic character sensing unit comprising a magnetic transducer head having a longitudinal non-magnetic gap therein, means for sweeping the width of said gap with a magnetic boundary, the magnetic flux density across the gap in one direction being substantially greater on one side of said boundary than on the other, and means to detect the change in flux across said gap occurring when said boundary sweeps over an edge of a magnetic character disposed in operative magnetic association with an area of said gap.

14. A magnetic character sensing unit as claimed in claim 13 wherein the detecting means is a coil wound on said transducer head so that the flux flowing across said gap also flows through said coil, the voltage induced in said coil being proportional to said changes in flux.

15. A magnetic character sensing unit as defined in claim 13 wherein the sweeping means includes a source of current varying linearly in time and a sweep winding connected to said source for producing across said gap a magnetic field varying linearly in time.

16. A magnetic character sensing unit as defined in claim 15 wherein said magnetic transducer head further includes a back gap which saturates along its width in accordance with the strength of the time varying magnetic field.

17. A magnetic character sensing unit as defined in claim 15 wherein said transducer head has an additional gap in the path of said flux, the length of said additional gap changing linearly in one direction along its width.

18. A magnetic character sensing unit as defined in claim 15 wherein said sweeping means further includes means for applying a linear magnetic field gradient along the width of said gap in opposition to said time varying magnetic field to provide a magnetic potential null point which sweeps the width of said gap.

References Cited in the file of this patent

UNITED STATES PATENTS 2,833,475 Dedek ------------------ May 6, 1958

UNITED STATES PATENT OFFICE
CERTIFICATE OF CORRECTION

Patent No. 3,030,014 April 17, 1962

Thomas R. Garrity

It is hereby certified that error appears in the above numbered patent requiring correction and that the said Letters Patent should read as corrected below.

Column 1, line 18, for "charactre" read -- character --; column 2, line 5, for "substantailly" read -- substantially --; column 5, line 41, for "tense" read -- sense --; line 61, for "FIG. 2A" read -- FIG. 3a --; column 6, line 3, for "magnettic" read -- magnetic --; line 68, for "letect" read -- detect --; column 7, lines 5 and 6, for "position, the sweep current is applied to detect changes in" read -- position 1. No part of the magnetic character appears in --; column 8, line 63, for "tis" read -- its --; column 9, line 61, for "occuring" read -- occurring --.

Signed and sealed this 14th day of August 1962.

(SEAL)
Attest:

ERNEST W. SWIDER
Attesting Officer

DAVID L. LADD
Commissioner of Patents